United States Patent [19]
Eaves

[11] 3,746,193
[45] July 17, 1973

[54] LOGGING MACHINE
[75] Inventor: Ronald S. Eaves, Louisville, Miss.
[73] Assignee: Taylor Machine Works, Louisville, Miss.
[22] Filed: Aug. 30, 1972
[21] Appl. No.: 285,101

Related U.S. Application Data
[62] Division of Ser. No. 141,263, May 7, 1971.

[52] U.S. Cl............. 214/92, 214/147 G, 212/59 R, 254/190 R
[51] Int. Cl. .......................... B66c 1/42, B66c 23/36
[58] Field of Search.................... 214/92, 86 A, 523, 214/147 G; 254/139.1, 190 R; 212/59 R

[56] References Cited
UNITED STATES PATENTS
3,477,596  11/1969  Michaelson et al................... 214/92
3,687,315   8/1972  Donaldson........................ 214/86 A

*Primary Examiner*—Albert J. Makay
*Attorney*—John R. Walker, III

[57] ABSTRACT

A self-propelled log grapple and skidding vehicle for grappling the one end of one or a group of felled trees to skiddingly drag the trees from a wooded area to a clearing for further processing. The vehicle includes a movable boom having a grappling device depending therefrom and winching apparatus for snaking felled trees out of areas that are inaccessible to the vehicle. The boom is operably moved by hydraulic lift and tilt cylinder devices which are positioned in such a manner that they are provided maximum protection, i. e., not susceptible to being damaged when the heavy trees supported by the grappling device inadvertently collide with the vehicle. A mounting support of a fair lead for the winching apparatus is included which will assure that the winch line load is not imposed on the boom or the lift cylinders.

4 Claims, 7 Drawing Figures

Patented July 17, 1973 3,746,193

Patented July 17, 1973 3,746,193

LOGGING MACHINE

CROSS REFERENCE TO RELATED APPLICATION

This application is a division of my co-pending application, Ser. No. 141,263, filed May 7, 1971, entitled "Logging Machine."

BACKGROUND OF THE INVENTION

1. Field of the Invention

This invention generally relates to loading devices and more specifically, to a self-propelled log skidding grapple vehicle.

2. Description of the Prior Art

Numerous loading or lifting devices have been patented, e. g., the Johnson U.S. Pat. No. 2,651,424; the La Tendresse U.S. Pat. No. 2,788,143; the Lull U.S. Pat. No. 3,327,879; the O'Neil U.S. Pat. No. 3,439,818; and the Larson et al. U.S. Pat. No. 3,452,888.

A more recent concept in moving felled trees from a wooded area to a clearing for further processing utilizes a machine commonly referred to in the art as a log skidding grapple. The Nelson U.S. Pat. No. 3,417,887; the Michaelson et al. U.S. Pat. No. 3,477,596; and the Stone U.S. Pat. No. 3,513,998 each pertain to a log skidder device. The machine of the present invention is an improvement over existing machines of this latter category. Since the background and the state of the art, as known by the applicant, is well disclosed in the above-mentioned latter three patents, the above description of the prior art will suffice for present purposes.

Certain skidder grapple machines are cumbersome to manipulate or lack sufficient maneuverability to readily position the grapple. For example, in the process of lowering the grapple for the Stone '998 patent, the operator must compensate for the rearward travel of the grapple. Obviously, this is aggravating, particularly in view of the fact that the operator must move the vehicle forward a distance substantially equal to the rearward travel of the grapple in order to position the grapple directly over the log. Further, certain of these machines includes a fair lead for a winch line that is mounted in such a manner that the winch line load is imposed on the main boom or the lift cylinders, e. g., the Michaelson et al. '996 patent and the Stone '998 patent. Such construction imposes undue stress on these component members, with the possibility of breakdowns and the necessity of repairs.

SUMMARY OF THE INVENTION

The present invention is directed toward overcoming the disadvantages and problems relative to previous skidder grapple machines. The concept of the present invention is to provide a self-propelled log skidding grapple machine for grappling the one end of one or a group of felled trees to skiddingly drag the trees from one location, e. g., a heavily wooded area, to a second location, e. g., a clearing or the like, for further processing, e. g., loading onto transporting vehicles or the like. The machine includes a maneuverable boom having a grappling device depending therefrom and winching apparatus for snaking felled trees out of areas that are inaccessible to the machine. The boom is operably moved by hydraulic lift and tilt cylinder devices which are positioned in such manner that they are provided the maximum protection so that they are not susceptible to being damaged when the heavy trees clampingly supported by the grappling device inadvertently collide with the vehicle. A peculiar mounting support of a fair lead for the winching apparatus is included which will assure that the winch line load is not imposed on the boom or the lift cylinders. The suspended grappling device per se is conventional in construction, e. g., like that taught by the Stone patent '998. Additionally, conventional principles are employed in the construction of the machine or vehicle chassis and the usual automotive characteristics thereof.

The machine of the present invention includes structure which provides optimum maneuverability for the suspended grappling device, i. e., the grappling device may be raised and lowered direcly above a log and/or may be moved fore and aft, without moving the machine or vehicle.

DESCRIPTION OF THE PREFERRED EMBODIMENT

Figure 1:
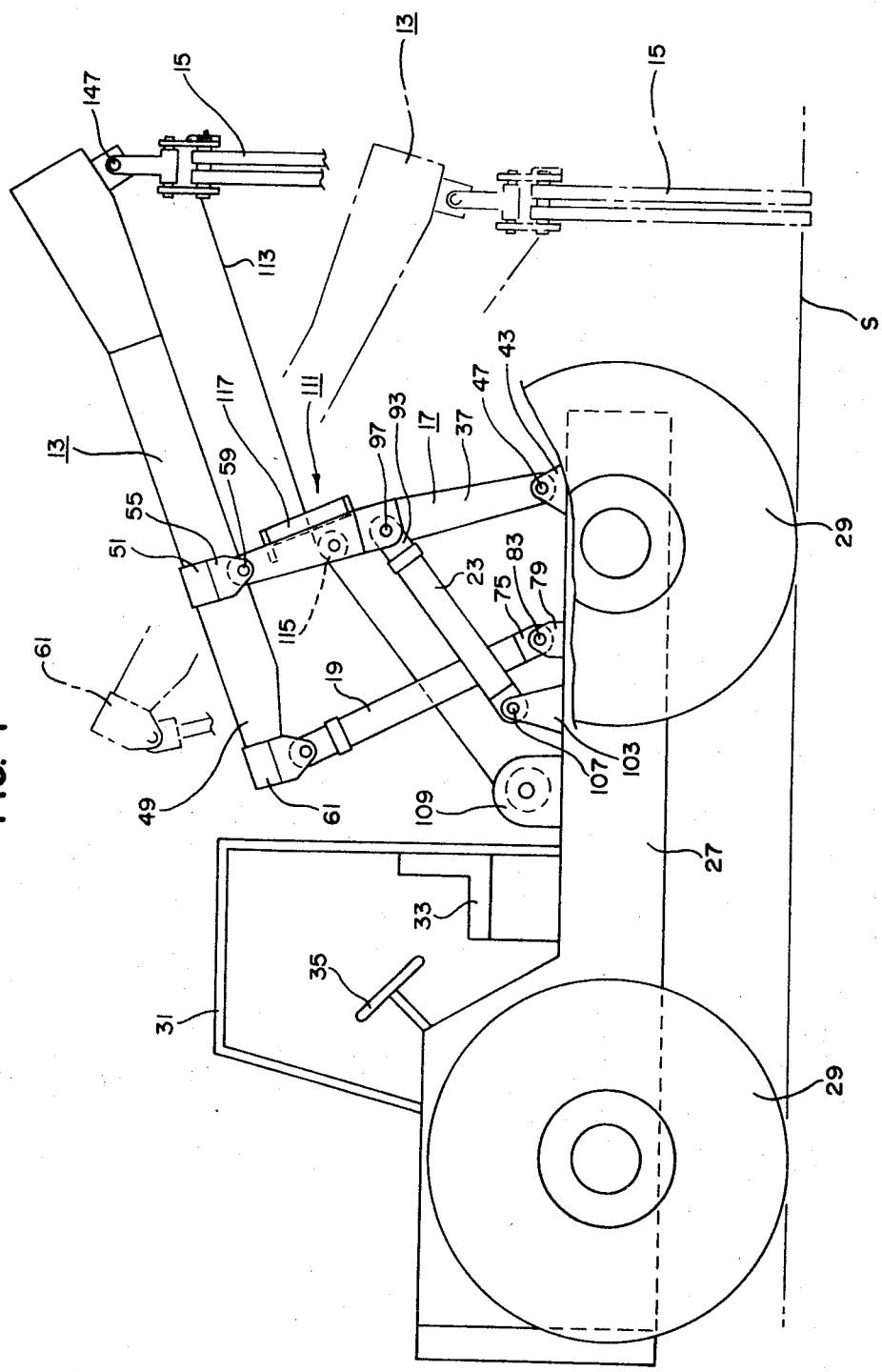
FIG. 1 is a side elevational view of the machine of the present invention showing the boom, having the grapple means depending therefrom, in an elevated forwardmost position and phantomized in a displaced lower forwardmost position.

The self-propelled log skidder grapple machine 11 of the present invention is a piece of heavy equipment for grappling one or several parallel arranged tree trunk logs adjacent one of the respective ends thereof to skiddingly drag the logs from one location, e. g., a thickly wooded area, to a second location, e. g., a clearing or the like, where further processing is accomplished, e. g., loading onto other transport vehicles or the like. The machine 11 generally comprises a tractor-like vehicle which includes an operable boom 13 having a conventional operable grapple 15 depending from the rearward end thereof, a fulcrum-like elongated support member 17 for supporting the boom 13 a spaced apart distance above the rearward end of the machine 11, a first pair of operable hydraulic cylinders or lift cylinders 19, 21 for selectively raising and lowering the grapple 15, a second pair of operable hydraulic cylinders or tilt cylinders 23, 25 for selectively moving the grapple 15 forward and rearward.

The machine 11 includes the usual automotive structure to facilitate the self-propulsion thereof, e. g., a frame 27 ridably supported a distance above the ground by a plurality of wheels 29, a prime mover, transmission, a differential, etc. (not shown), a cab 31 housing a seat 33 to accommodate the operator, and numerous controls, e. g., a steering wheel 35 or the like and other typical lever-actuated valves (not shown), etc. for selectively operating the grapple 15 and the cylinders 19, 21, 23, 25, etc.

Figure 4:
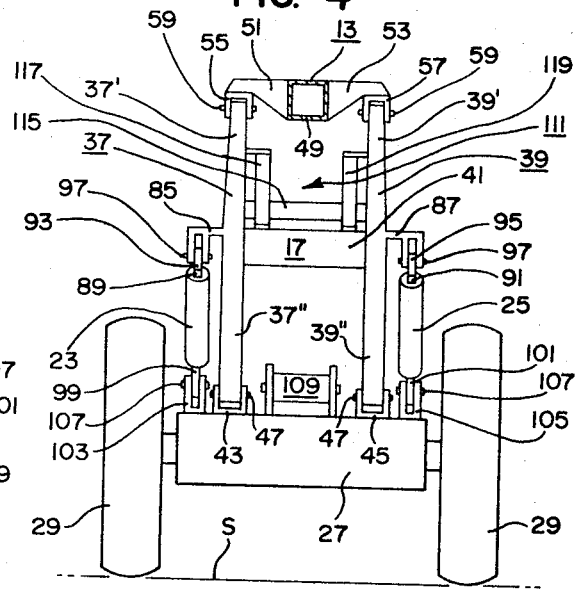
FIG. 4 is a sectional view taken as on the line IV—IV of FIG. 2, also with certain structure removed for purposes of clarity and simplicity.

The support member 17 comprises H-shaped structure which includes a pair of vertically disposed box-like members 37, 39 and a horizontally disposed box-like member 41 interconnected between the vertical members 37, 39 to define a pair of upwardly directed leg portions 37', 39' and a pair of downwardly directed leg portions 37'', 39'', as best viewed in FIG. 4 of the drawings.

The lower ends of the respective downwardly directed legs 37'',39'' are pivotally attached to the machine 11 adjacent the rearward end thereof, i. e., a pair of upwardly directed clevises 43, 45 are fixedly attached as by welding or the like to the frame 27. The clevises 43, 45 and the respective legs 37'', 39''pivotally receive a pair of pivot pins 47 in a typical manner.

The boom 13 preferably comprises an elongated tubular box-like main body member 49, having a shape substantially as depicted in the drawings. The interior of the member 49 protectively houses the usual conduits (not shown) for actuating the usual hydraulic cylinders (not shown) suitably attached to the grapple 15 for the usual operation thereof.

The boom 13 additionally includes a rearward or first pair of outwardly directed support arms 51, 53 having the root or inner ends thereof fixedly attached to the member 49 as by welding or the like. The outer ends of the arms 51, 53 respectively carry a first pair of downwardly directed clevises 55, 57 for pivotally receiving the upper ends of the upwardly directed leg portions 37', 39', i. e., the clevises 55, 57 and the upper ends of the leg portions 37', 39'are provided with suitable apertures (not shown) for receiving a pair of typical pivot pins 59.

The boom additionally includes a forward or second pair of outwardly directed support arms 61, 63 having the root or inner ends thereof fixedly attached as by welding or the like to the main body member 49 adjacent the forward end thereof. The outer ends of the arms 61, 63 respectively carry a second pair of downwardly directed clevises 65, 67 for pivotally receiving the respective upper ends of the hydraulic cylinders 19, 21, i. e., the cylinders 19, 21 respectively including the usual actuating rods 69, 71. In other words, the clevises 65, 67 and the upper ends of the actuating rods 69, 71 are provided with suitable apertures (not shown) for receiving a pair of typical pivot pins 73.

It should be understood that the support arms 51, 53, 61, 63 preferably are tubular or box-like in construction in order to enchance the load-carrying capability thereof. However, other well known techniques may be implemented for reinforcing the arms 51, 53, 61, 63 so as to adequately support the load stresses thereon, e.g., suitable channel members or bridging or the like.

The lower ends of the cylinders 19, 21 respectively include a pair of lugs 75, 77. The lugs 75, 77 respectively are received in a pair of clevises 79, 81 in the usual manner, i.e., the clevises 79, 81 and the lugs 75, 77 are provided with suitable apertures (not shown) for receiving a pair of typical pivot pins 83. The clevises 79, 81, being positioned adjacent the rearward end of the machine 11 but spaced immediately forward of the clevises 43, 45 are fixedly attached to the frame 27 as by welding or the like.

The support 17 additionally includes a pair of stirrups 85, 87 fixedly attached thereto as by welding or the like. The stirrups 85, 87 defining outwardly directed extensions of the horizontal member 41, pivotally receive respectively the cylinders 23, 25. In other words, the cylinders 23, 25 include the usual actuating rods 89, 91 having fixedly attached adajcent the outer end thereof respectively a pair of lugs 93, 95. Accordingly, the stirrups 85, 87 and the lugs 93, 95 are provided with suitable apertures (not shown) for pivotally receiving a pair of typical pivot pins 97.

The lower ends of the cylinders 23, 25 respectively include a pair of lugs 99, 101 which are pivotally attached to the rearward end of the machine 11. In other words, the lugs 99, 101 respectively are pivotally received by a pair of clevises 103, 105, i. e., the lugs 99, 101 and the clevises 103, 105 are provided with suitable apertures (not shown) for pivotally receiving a typical pivot pin 107. It should be understood that the clevis 103 is positioned forward of the clevis 79 and outboard therefrom so as to be in alignment with the stirrup 85 and is fixedly attached to the frame 27 as by welding or the like. Further, the clevis 105 is positioned forward of the clevis 81 and outboard therefrom so as to be in alignment with the stirrup 87 and is fixedly attached to the frame 27 as by welding or the like.

It should be pointed out that machine 11 may be driven over extremely rough terrain and additionally possesses sufficient power to drag an extremely heavy load over a surface S from a first location to a second location. From FIG. 1 of the drawings, it may be seen that the tilt cylinders 23, 25 are retracted so that the boom 13 is in its most forward position. Additionally, the lift cylinders 19, 21 are retracted which raises the grapple 15 to its highest position. Further, portions of the machine are shown in phantom so as to depict the placement of the boom 13 and the grapple 15 in a lower position, i. e., the cylinders 19, 21 being extended so as to pivot the boom 13 about a fulcrum or the pivot pins 59. Thus, the support member 17 acts as a fulcrum and the distance between the respective arms 51, 53; 61, 63, being predetermined, provides leverage for minimizing the load on the cylinders 19, 21.

Figure 2:
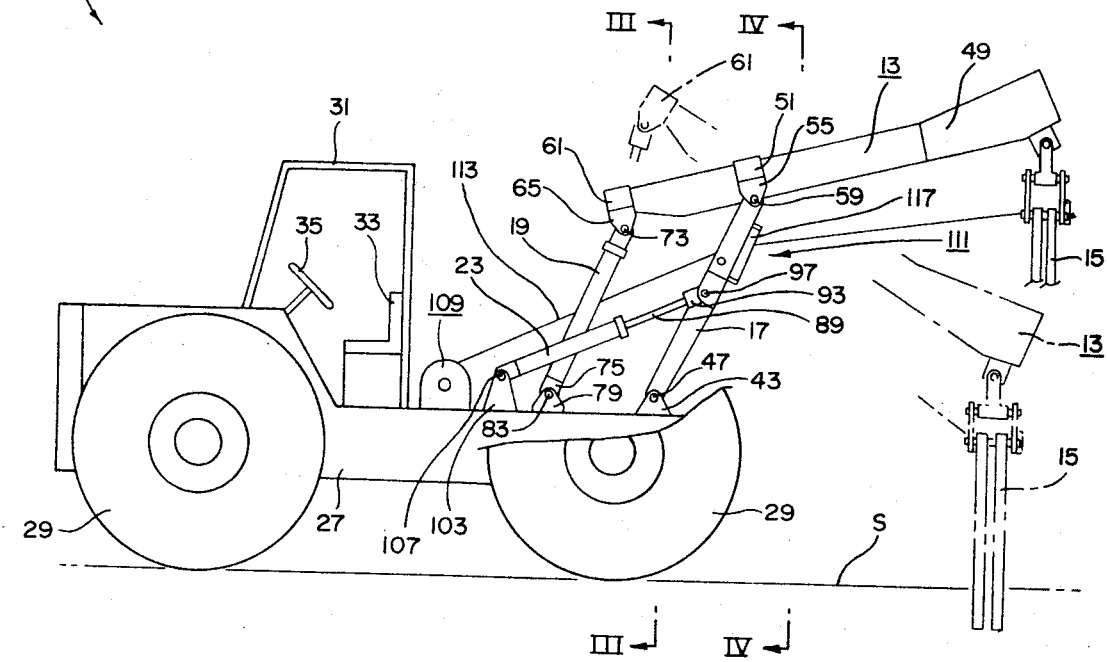
FIG. 2 is also a side elevational view of the machine of the present invention showing the boom, having the grapple means depending therefrom, in an elevated rearwardmost position and phantomized in a lower rearwardmost position.
Figure 3:
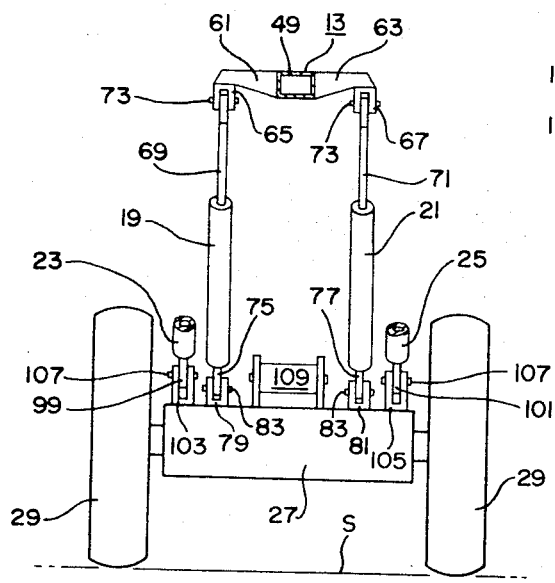
FIG. 3 is a sectional view taken as on the line III—III of FIG. 2 with certain structure removed for purposes of clarity and simplicity.

From FIG. 2 of the drawings, it may be seen that the lift cylinders 19, 21 are in the retracted position which raises the grapple 15. Further, the tilt cylinders 23, 25 are in the fully extended position which moves the boom 13 to its most rearward position. Additionally, certain structure of the machine 11 is shown in phantom in order to depict the displacement thereof when the left cylinders 19, 21 are fully extended. In other words, extending and retracting the cylinders 23, 25 causes the boom 13 to move fore and aft, i. e., the boom pivots about the pivot pins 59, 73, the support member 17 pivots about the lower pivot pins 47, and the lower ends of the lift cylinders 19, 21 pivot about the pivot pins 83.

From FIGS. 1 and 2 of the drawings, it may be seen that the machine 11 is capable of picking up logs which may be a distance below the surface S upon which the machine 11 may be resting, i. e., the grapple 15 may selectively be lowered into a slight depression or the like in order to grapple a log. Further, it should be obvious to those skilled in the art that the above four positions for the grapple 15 are conveniently intended to illustrate the extreme travel, however, infinite intermediate positions of the lift cylinders 19, 21 and/or the tilt cylinders 23, 25 may easily be achieved by manipulating typical lever actuated valves (not shown) within the cab 31. Thus, the machine 11 is considerably more maneuverable on grappling logs than other log grappling machines known by the applicant.

The machine 11 includes a winch assembly 109 for snaking logs from certain locations which may be inaccessible to the machine 11. The winch assembly 109 includes a fair lead 111 for a winch line 113. The fair lead 111 comprises a horizontally disposed roller 115 and a pair of vertically disposed 117, 119. The horizontal roller 115 is positioned between the upwardly directed legs 37', 39' superjacent the horizontal member 41 and is rotatably attached to the legs 37', 39 in any suitable manner obvious to those skilled in the art. The vertical roller 117 is positioned adjacent one end of the roller 115 so that a portion thereof extends above and below the roller 115 and is rotatably attached to the leg 37' in any suitable manner obvious to those skilled in the art. The roller 119 is positioned adjacent the opposite end of the roller 115 so that a portion thereof extends above and below the roller 115 and is rotatably attached to the leg 39' in a suitable manner obvious to those skilled in the art. In other words, an important feature of the present invention is that the winch line load is exclusively supported by the support member 17, i. e., the winch line load is not imposed on the main boom or the lift cylinders as is commonly done on other skidder grappling machines kmown by the applicant.

The winch assembly 109 includes the usual power operating structure (not shown) so that the operator may remotely control the paying out or taking up of the winch line 113 in the usual manner. The free end of the winch line 113, when not being used for snaking a log or the like, preferably is attached to the grapple 15 by a unique anchoring device 121 to be described in detail hereinafter. Thus, tension is preferably maintained on the winch line 113 when the machine 11 is skiddingly dragging a log so as to minimize the wear and tear on the structure suspending the grapple 15 from the boom 13. Additionally, when the machine 11 is traveling over the rough surface S and is not dragging a log, the grapple 15 is precluded from swinging by tension being maintained on the winch line 113 in like manner as just described.

Figure 5:
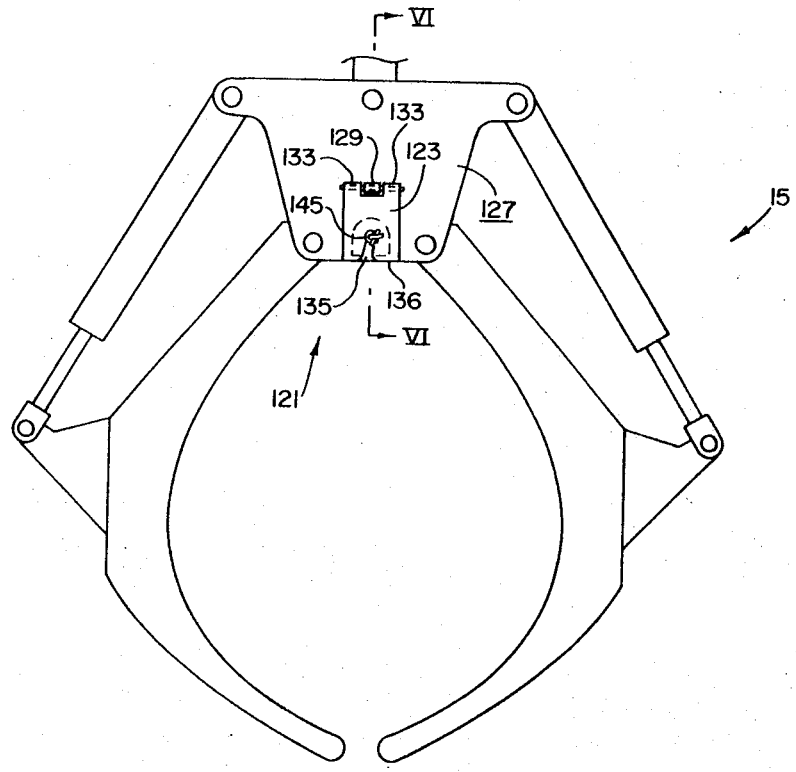
FIG. 5 is a front elevational view of a portion of the machine of the present invention.
Figure 6:
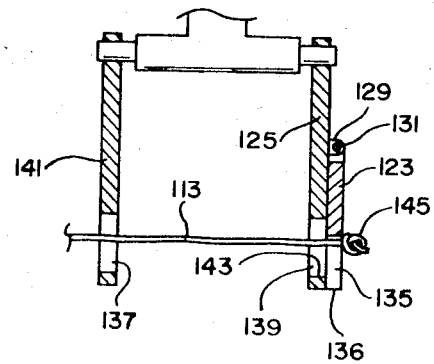
FIG. 6 is a sectional view taken as on the line VI—VI of FIG. 5 and showing the winch line in place in the anchoring device.
Figure 7:
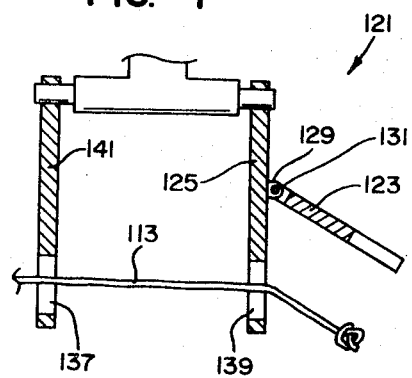
FIG. 7 is a view similar to FIG. 6 showing the winch line being released by the anchoring device.

Referring now more particularly to FIGS. 5—7, anchoring device 121 comprises an anchor plate 123 hingedly mounted on grapple 15. The place of mounting is preferably on the rearward side of the rearward plate 125 of the grapple frame means 127 where it is hingedly mounted as by a lug 129 attached to plate 125 and a hinge pin 131 extending through aligned bores in lug 129 and ears 133 provided on the upper edge of anchor plate 123. Plate 123 is pivotable between a normal vertical depending position shown in FIG. 6 to raised angular positions (one being shown in FIG. 7). Plate 123 is provided with a slot 135 extending upwardly from the lower edge 136 of plate 123 which is adapted to receive line 113 that extends through aligned apertures 137, 139 respectively provided in the forward and rearward plates 141, 125 of grapple frame means 127. The lower edge 136 of plate 123 extends below aperture 139 so that the portion 143 of rearward plate 125 will prevent removal of line 113 when plate 123 is in said depending position shown in FIG. 6. Stop means, such as a knot 145 larger than the width of slot 135 is provided in the end of line 113 to anchor the end of line 113, as shown in FIG. 6 wherein it will be seen the knot 145 is placed adjacent the rearward side of plate 123. It will be understood that pull on line 113 forward or to the left as viewed in FIG. 6 will cause grapple 15 to pivot about its pivotal attachment 147 (FIG. 1) to boom 13 so that the lower end of grapple 15 may be swung forwardly, as desired. Thus, anchoring device 121 provides a positive means of attachment, yet line 113 can be quickly unfastened and used in the conventional manner. Disengagement is accomplished by the operator quickly, easily, and without tools. When the line 113 is new, the ferrule, not shown, usually provided on the end of a new line can be used as the stop means. Then, after wear and the ferrule is broken off, knot 145 can be tied in the end of line 113 to provide the stop means.

Although the invention has been described and illustrated with respect to a preferred embodiment thereof, it is not to be so limited since changes and modifications may be made therein which are within the full intended scope of the invention.

I claim:

1. A self-propelled log skidder grapple machine for grappling a plurality of parellel arranged tree trunk logs adjacent one of the respective ends thereof to skiddingly drag the logs from a first location to a second location for further processing comprising a tractor-like vehicle having front and rear ends, operable grapple means; boom means for supporting said grapple means, said boom means being coaxially aligned with said vehicle and disposed a spaced apart distance above the rearward end thereof, said boom means having fore and aft ends with said aft end being free and extending rearwardly beyond said vehicle, and said aft end having said grapple means depending therefrom; fulcrum-like elongated support means for supporting said boom means, said support means having the lower end thereof pivotally attached to the rearward end of said vehicle and the upper end thereof pivotally attached to said boom means a predetermined distance from said fore end thereof; first operable hydraulic cylinder means for selectively raising and lowering said grapple means, said first hydraulic cylinder means having the lower end thereof pivotally attached to said vehicle adjacent the rearward end thereof but forward of said pivotally attached support means, and the upper end of said first hydraulic cylinder means being pivotally attached to said boom means adjacent said fore end thereof so that extending or retracting said first cylinder means causes said boom means to pivot about the upper end of said support means; and second operable hydraulic cylinder means for selectively moving said grapple means forward and rearward, said second cylinder means having one end thereof pivotally attached to said vehicle adjacent the rearward end thereof but forward of said pivotally attached support means, and the other end of said second cylinder means being pivotally attached to said support means substantially intermediate the ends thereof so that extending or retracting said second cylinder means causes said support means and said first cylinder means to simultaneously pivot about their respective upper and lower pivot points; said fulcrum-like support means comprising H-shaped structure including a pair of vertically disposed boxlike members interconnected intermediate the ends thereof with a horizontally disposed boxlike member to define a pair of upwardly directed leg portions of said vertical members and a pair of downwardly directed leg portions of said vertical members, the lower ends of said downwardly directed leg portions each being pivotally attached to said vehicle; including operable winch means having a winch line for snaking logs from certain locations which may be inaccessible to the machine.

2. The machine of claim 1 in which said winch means includes a fairlead for said winch line, said fairlead comprising at least one horizontally disposed roller means and a pair of vertically disposed roller means, said horizontal roller means being positioned superjacent said horizontal boxlike member of said support means and rotatably attached to said pair of vertical boxlike members thereof, and said pair of vertical roller means respectively being positioned adjacent the opposite ends of said horizontal roller means and rotatably attached to said upwardly directed leg portions of said vertical members of said support means so that the winch line load is exclusively supported by said support means.

3. In a self-propelled log skidder grapple machine of the type including a boom, a grapple depending therefrom, and a winch assembly including a winch line, means for anchoring the end of said winch line to said grapple comprising an anchor plate, means pivotally mounting said anchor plate from said grapple for pivot between a normal position adjacent said grapple and raised angular positions relative to said grapple, stop means on said line adjacent the end thereof, said anchor plate being provided with a slot extending from an edge of said plate inwardly and having a width greater than the diameter of said line but less than the size of said stop means, whereby said line is adapted to be removably received in said slot with said stop means adjacent said plate on the remote side thereof from said grapple to removably anchor the end of said line.

4. The apparatus of claim 3 in which is included means on said grapple for blocking the end of said sot when said plate is in said normal position to prevent accidental removal of said line.

* * * * *